Figure 1:
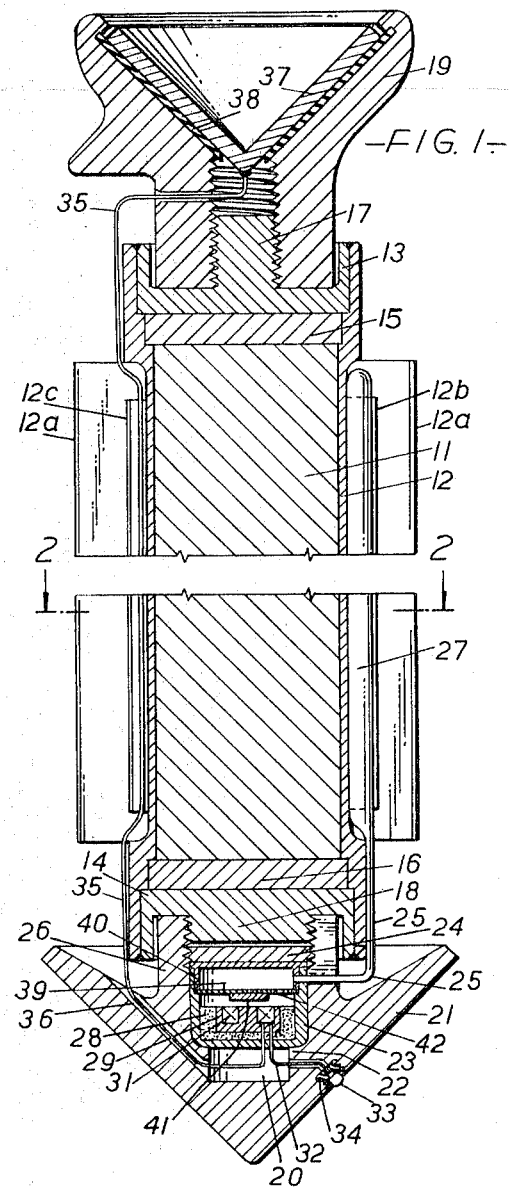

United States Patent Office 3,296,864
Patented Jan. 10, 1967

3,296,864
MEASUREMENT OF TEMPERATURE
AND PRESSURE
Wellesley Ashe Kealy, Lymm, Richard Smart, Urmston, and Edward Duncombe, Great Saughall, Chester, England, assignors to United Kingdom Atomic Energy Authority, London, England
Filed Feb. 26, 1962, Ser. No. 175,495
Claims priority, application Great Britain, Mar. 6, 1961, 8,164/61
4 Claims. (Cl. 73—339)

This invention relates to measuring apparatus and principally apparatus for measuring the temperatures of nuclear reactor fuel elements although apparatus according to the invention can be used for measuring the temperature of elements other than nuclear reactor fuel elements and, insofar as reliance is placed upon a pressure-sensitive characteristic, apparatus according to the invention can be used for measuring pressures.

Measurement of fuel element temperature in a nuclear reactor is customarily made by a thermocouple. This necessarily involves the use of an electrical connection between the thermocouple and a recording station outside the reactor. One connection, to the outermost element of an end-to-end fuel element assembly, has been used free of any breakable contact. Whilst this has tended to complicate refuelling procedures, it is regarded as reliable and acceptable. Serious difficulties arise, however, when an attempt is made to measure the temperature of a fuel element which is not an outermost one or, more ambitiously, an attempt is made to measure the temperature of a large number of fuel elements located at significant internal positions in the reactor. The choice, in these circumstances, appears to be either a festoon of electrical connections to the thermocouples or some form of breakable electrical contact device such as contact rings built into the reactor structure with sliding contacts on the fuel elements. The festoon of connections soon appears impracticable in view of refuelling considerations and the contact devices suffer from an inherent variable resistance characteristic, they may introduce thermo-electric E.M.F.'s or other spurious signals and they suffer from difficulties in maintenance especially when built into an inaccessible reactor core structure.

The present invention provides, in one of its aspects, measuring apparatus for measuring fluid pressure and hence the temperature of a body influencing said pressure comprising a diaphragm having a resonant frequency dependent upon the pressure imposed upon it, means for oscillating said diaphragm through a range of frequencies including its resonant frequency, and means for measuring the frequency of resonance.

In another of its aspects, the present invention provides a pressure-sensitive transducer comprising a fluid-filled chamber, a diaphragm within the chamber and an electromagnetic coil for vibrating the diaphragm, whereby the resonant frequency of the diaphragm, which is dependent upon the pressure of the fluid within the chamber, is detectable by the effect of resonance on the electrical impedance offered by the coil.

Preferably means are provided to balance the fluid pressures on each side of the diaphragm. In this way it is assured that the resonant frequency of the diaphragm is dependent solely upon the fluid pressure to be measured. In one embodiment of the invention the chamber is sealed so that the pressure of the fluid in the chamber is controlled by the temperature of the fluid.

In another of its embodiments the transducer has a fluid-filled chamber of relatively small volume and a closed, fluid-filled bulb of relatively large volume in communication with the fluid-filled chamber so that the pressure of the fluid in the chamber is governed by the temperature of the fluid in the bulb.

Transducers in accordance with the invention have particular advantages in measuring temperature or pressure at a plurality of points. For this purpose a plurality of pressure-sensitive transducers are arranged with their coils electrically connected in series and having diaphragms of differing resonant frequency, in combination with an oscillator to supply an alternating signal of variable frequency to the coils and a detector to determine the resonant frequency of each diaphragm.

Transducers according to the invention can be made very small (for example they may be housed in a capsule of 1 cm. diameter and 0.75 cm. in depth) and can therefore be accommodated in small pockets at suitable locations remote from the point where measurement is to be made. In this manner the transducers are useful for the measurement of the temperature of a nuclear reactor fuel element. In this application, a nuclear fuel element is equipped with a pressure-sensitive transducer housed in a cavity in an end-fitting of the fuel element and having a closed, fluid-filled bulb in communication with the fluid-filled chamber, as described above, the bulb being elongate and extending axially of the fuel element in good heat-conducting reationship therewith so that the resonant frequency of the diaphragm is sensitive to the temperature of the fuel element.

This invention also provides a method for measuring the pressure of a fluid comprising vibrating, by means of an electromagnetic coil, a diaphragm mounted within the fluid, varying the frequency of vibration of the diaphragm, and detecting the resonant frequency of the diaphragm, which is dependent upon the fluid pressure, by means of the effect of resonance of the diaphragm on the electrical impedance offered by the coil.

Figure 2:
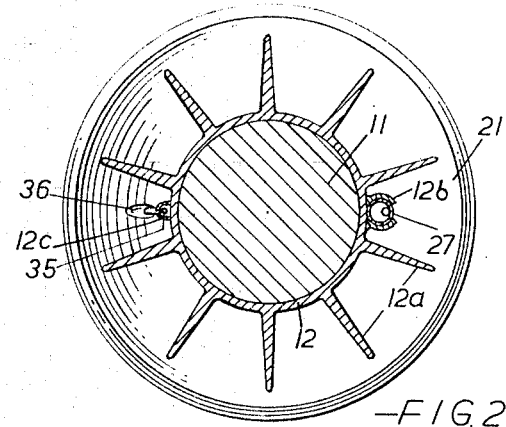
Figure 3:
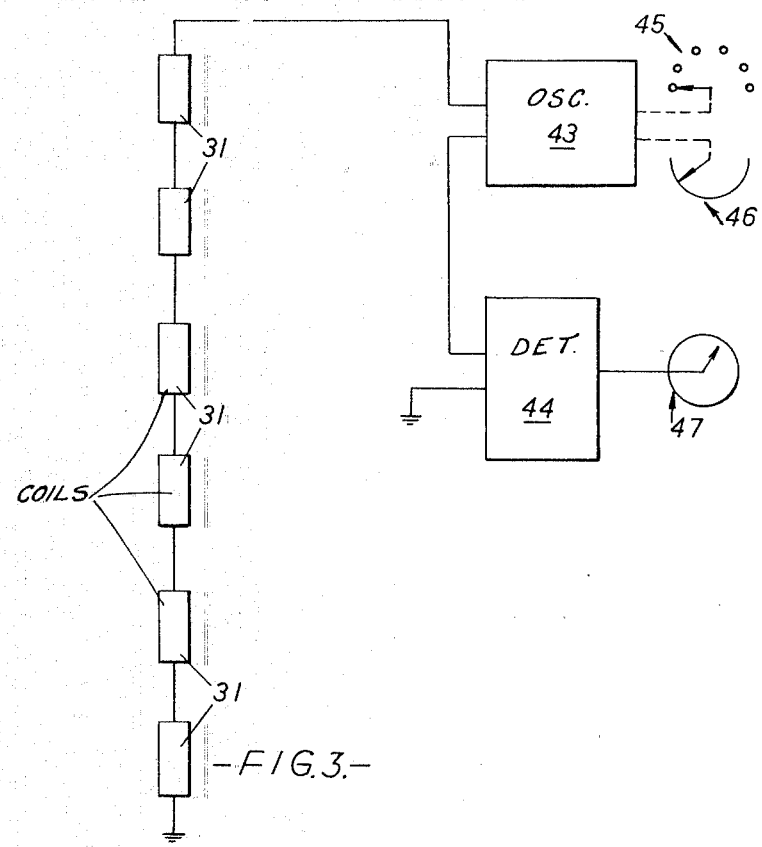

One particular embodiment of the invention will now be described by way of example with reference to the accompanying drawings, in which FIGURE 1 shows a diagrammatic section through a nuclear fuel element equipped with a transducer embodying the invention, FIGURE 2 is a section on the line 2—2 of FIGURE 1, and FIGURE 3 shows a block diagram of a plurality of the elements of FIGURE 1 and apparatus associated therewith.

In this embodiment, a nuclear fuel member 11 (FIGURES 1 and 2) is enclosed in a magnesium alloy sheath 12 having longitudinal heat transfer fins 12a and locating fins 12b, 12c. The sheath 12 is sealed by end caps 13 and 14. The fuel member is spaced from the end caps by heat insulating discs 15 and 16. The end caps have threaded bosses 17, 18 onto which are screwed end fittings 19, 21 enabling a series of fuel elements to be stacked in a column. The lower end fitting is hollowed to form a cavity 20 with an internal shoulder 22. A transducer capsule 23 bears against the shoulder 22 and is retained in the cavity by a screwed disc 24. The capsule which is sealed is filled with carbon dioxide. A capillary tube 25 welded to the capsule extends through a slot 26 in the end fitting and establishes communication between the capsule interior and an elongate, carbon dioxide filled bulb 27 which extends axially of the fuel element and is held by locating fins 12b. Within the capsule a block 28 of electrically insulating material mounts a soft iron core 29 around which an electromagnetic coil 31 is wound. Electrical leads 32 in parallel are taken from the coil 31 to three contact assemblies (of which one is shown) each having a contact stud 33; these three studs 33, which are equispaced around the end fitting 21, are stainless steel and are insulated from the adaptor by plugs 34 of sintered aluminum oxide which hold the studs and are screwed into the end fitting. An electrical lead 35, of opposite polarity to the leads 32, is taken from the coil 31 through a bore 36 in the end fitting, along the fuel element, being held by locating fins 12c, to an upper contact plate 37 which takes the form of a conical cup of magnesium alloy which rests on an electrically insulating conical cup 38 of sintered aluminum oxide. Within the capsule a diaphragm 39 is clamped between an internal shoulder of the capsule and a screwed ring 40. The diaphragm carries a small soft iron armature 41 which can be influenced by the electromagnet 29, 31. An aperture 42 through the diaphragm allows balance of the carbon dioxide pressures on either side of the diaphragm.

In a nuclear reactor a plurality of fuel elements (each as shown in FIGURE 1) are stacked in a column and electrical contact between the plate 37 and the studs 33 of adjacent elements places the coils 31 of the elements in series (indicated diagrammatically in FIGURE 3). An earth return from the lowest element is made by contacting the studs of the lowest element with part of the reactor structure. The diaphragms of each of the elements are arranged to have resonant frequenciese which are spaced from each other so that the band of frequencies at which one diaphragm resonates for various temperatures does not overlap a similar band of frequencies for another diaphragm. These frequency bands may be adjusted by altering the mass of the armatures 41. In the embodiment shown in FIGURE 3 it is arranged that the resonant frequency bands for the diaphrags associated with the six coils are 2.2 to 2.5 kc./s., 2.7 to 3.0 kc./s., 3.2 to 3.5 kc./s., 3.7 to 4.0 kc./s., 4.2 to 4.5 kc./s., and 4.7 to 5.0 kc./s. Within each frequency band, the resonant frequency of each diaphragm is dependent upon the pressure of gas in which is mounted and this in turn is governed by the pressure of gas in its associated bulb and therefore by the temperature of its associated fuel element, the bulb being in good, heat conducting relationship with the fuel element. Accordingly, the temperature of each fuel element can be obtained by detecting the resonant frequency of its associated diaphragm and this resonant frequency is indicated by an increase of the apparent impednace of the coil 31 driving the resonating diaphragm.

Detection of the resonant frequencies of the diaphragm is effected by means of an oscillator 43 and a detector 44. The oscillator 43 applies an oscillating signal of known frequency to all the coils 31. By means of the selector 45, the frequency of the oscillator output is adjusted by an operator to correspond to one of the six resonant frequency bands appropriate to the six diaphragms and their associated coils 31. By means of the selector 46 the frequency of the oscillator output is swept over the frequency band selected by the selector 45 while a meter 47 associated with the detector 44 is watched. The meter 47 indicates the power taken by the coils 31 which rises to a peak when one of the diaphragms associated with the coils is resonating; thus the detector may comprise a resistor in series with the line between the oscillator and earth and an amplifier, the voltage output of the amplifier being indicated on the meter.

In operation, an operator selects the frequency band appropriate to each of the six fuel elements in turn, by means of the selector 45, and sweeps over the frequency band, by means of the selector 46, to determine at what frequency the diaphragm of the selected element resonates. The selector 46 is calibrated in temperature so that the temperature of the selected element can be read off directly. Repetition of this procedure for each of the fuel elements enables measurement of the temperatures of the six elements.

It is to be understood that this invention is not limited to the details of the foregoing example. For instance, well-known data logging technique may be employed to obtain measurements of the temperatures of a plurality of fuel elements automatically. Furthermore, coaxial wires with two contactors at each end of each fuel element may be employed to interconnect the transducers of the elements, thus obviating the need for an earth return through the reactor structure.

We claim:
1. A pressure sensitive transducer comprising:
 (i) means defining a small gas-filled cavity of length less than its transverse dimensions,
 (ii) a diaphragm in said cavity,
 (iii) means for supporting said diaphragm transverse to said cavity and party-way along the length of the cavity,
 (iv) means defining a passageway for gas from one side of said diaphragm to the other, and
 (v) means for oscillating said diahpragm over a range of frequencies including its resonant frequency.
2. In combination with a nuclear reactor and located in said reactor at a locality subject to intense nuclear radiation and to temperature change a pressure sensitive transducer comprising means defining a small gas-filled cavity of length less than its transverse dimensions, a diaphragm in said cavity, means for supporting said diaphragm transverse to said cavity and part-way along the length of the cavity, means defining a passageway for gas from one side of said diaphragm to the other, and means for oscillating said diaphragm over a range of frequencies including its resonant frequency.
3. In combination with a nuclear reactor fuel element and encompassed within the contours of said fuel element a pressure sensitive transducer comprising means defining a small gas-filled cavity of length less than its transverse dimensions, a diaphragm in said cavity, means for supporting said diaphragm transverse to said cavity and part-way along the length of the cavity, means defining a passageway for gas from one side of said diaphragm to the other, and means for oscillating said diaphragm over a range of frequencies including its resonant frequency.
4. Apparatus for measuring the pressure of a closed body of gas comprising means defining a gas-filled cavity, a diaphragm supported in said cavity and having gas on either side thereof, means permitting gas in the cavity to pass from one side of said diaphragm to the other, electromagnetic coil means for vibrating said diaphragm through a selected range of frequencies including the resonant frequency of said diaphragm in said gas-filled cavity, and means for detecting the resonant frequency of said diaphragm, whereby to determine the pressure and hence the temperature of the gas in said cavity.

References Cited by the Examiner

UNITED STATES PATENTS

| | | | |
|---|---|---|---|
| 2,374,055 | 4/1945 | Treanor | 73—368 |
| 2,536,025 | 1/1951 | Blackburn | 73—362 |
| 2,568,277 | 9/1951 | Eltgroth | 73—24 |
| 2,856,341 | 10/1958 | Kanne | 204—159.2 |
| 3,087,886 | 4/1963 | Robinson | 73—362 |

LOUIS R. PRINCE, *Primary Examiner.*

ISAAC LISANN, *Examiner.*

S. H. BAZERMAN, *Assistant Examiner.*